US012482952B2

(12) United States Patent
Bagherimoghim et al.

(10) Patent No.: US 12,482,952 B2
(45) Date of Patent: Nov. 25, 2025

(54) ROTATED RIDGE WAVEGUIDE ANTENNA

(71) Applicant: GAPWAVES AB, Gothenburg (SE)

(72) Inventors: Alireza Bagherimoghim, Gothenburg (SE); Hanna Karlsson, Gothenburg (SE); Carlo Bencivenni, Gothenburg (SE)

(73) Assignee: GAPWAVES AB, Gothenburg (SE)

(*) Notice: Subject to any disclaimer, the term of this patent is extended or adjusted under 35 U.S.C. 154(b) by 197 days.

(21) Appl. No.: 18/562,396

(22) PCT Filed: May 19, 2022

(86) PCT No.: PCT/SE2022/050494
§ 371 (c)(1),
(2) Date: Nov. 20, 2023

(87) PCT Pub. No.: WO2022/245274
PCT Pub. Date: Nov. 24, 2022

(65) Prior Publication Data
US 2024/0186720 A1 Jun. 6, 2024

(30) Foreign Application Priority Data
May 20, 2021 (SE) .................................... 2130135-3

(51) Int. Cl.
*H01Q 13/10* (2006.01)
*H01P 3/123* (2006.01)
(Continued)

(52) U.S. Cl.
CPC ........... *H01Q 21/005* (2013.01); *H01P 3/123* (2013.01); *H01Q 1/3233* (2013.01); *H01Q 13/18* (2013.01); *H01Q 21/064* (2013.01)

(58) Field of Classification Search
CPC .. H01P 3/12; H01P 3/121; H01P 3/123; H01P 5/08; H01P 1/165; H01P 5/12;
(Continued)

(56) References Cited

U.S. PATENT DOCUMENTS 4,862,186 A * 8/1989 Strider ............... H01Q 21/0087 343/776
6,166,701 A * 12/2000 Park ..................... H01Q 21/005 343/756

(Continued)

FOREIGN PATENT DOCUMENTS

| | | | |
|---|---|---|---|
| EP | 2249437 | A1 | 11/2010 |
| EP | 3220481 | A1 | 9/2017 |
| WO | 2022245274 | A1 | 11/2022 |

OTHER PUBLICATIONS

International Search Report and Written Opinion for Application No. PCT/SE2022/050494 dated Jun. 14, 2022 (12 pages).

(Continued)

*Primary Examiner* — Tho G Phan
(74) *Attorney, Agent, or Firm* — Barnes & Thornburg LLP

(57) ABSTRACT

An antenna arrangement (100) comprising a radiation layer (110) comprising a first slot (111) and a second slot (112) extending along a first slot axis (D3) and second slot axis (D4), respectively, where the first and the second slots are arranged in a column (115) extending along a column axis (D5), and where the slot axes are arranged at respective non-zero third and fourth angles (a3, a4) with respect to the column axis; and a distribution layer (120) facing the radiation layer (110), comprising a first ridge waveguide comprising a first ridge (121) and a second ridge waveguide comprising a second ridge (122), wherein waveguiding paths (201, 202) of the first and second waveguides are configured to match respective shapes of the first and second (Continued)

ridges. A first section (123) of the first ridge (121) facing the first slot (111) extends along a first ridge axis (DI) and a second section (124) of the second ridge (122) facing the second slot (112) extends along a second ridge axis (D2), where the ridge axes are arranged at respective non-zero first and second angles (a1, a2) with respect to the column axis, where the first and second angles (a1, a2) are configured to match the third and fourth angles (a3, a4), respectively.

20 Claims, 9 Drawing Sheets

(51) Int. Cl.

| | |
|---|---|
| ***H01Q 1/32*** | (2006.01) |
| ***H01Q 13/18*** | (2006.01) |
| ***H01Q 21/00*** | (2006.01) |
| ***H01Q 21/06*** | (2006.01) |

(58) Field of Classification Search

CPC ........ H01P 1/211; H01Q 1/32; H01Q 1/3233; H01Q 1/52; H01Q 1/523; H01Q 13/00; H01Q 13/10; H01Q 13/18; H01Q 15/00; H01Q 15/0026; H01Q 21/00; H01Q 21/005; H01Q 21/06; H01Q 21/064; H01Q 21/0043; H01Q 21/24

See application file for complete search history.

(56) References Cited

U.S. PATENT DOCUMENTS

| | | | | |
|---|---|---|---|---|
| 7,379,029 | B2 * | 5/2008 | Rolnik | H01Q 21/0043 343/770 |
| 7,411,472 | B1 * | 8/2008 | West | H01Q 21/0093 342/368 |
| 10,431,902 | B2 * | 10/2019 | You | H01Q 21/064 |
| 10,468,779 | B2 * | 11/2019 | Mandeville | H01Q 21/0006 |
| 10,559,891 | B2 * | 2/2020 | Biancotto | H01Q 21/064 |
| 10,971,824 | B2 * | 4/2021 | Baumgartner | H01Q 13/06 |
| 11,381,000 | B2 * | 7/2022 | You | H01Q 21/061 |
| 2018/0358709 | A1 | 12/2018 | You et al. | |
| 2020/0251831 | A1 | 8/2020 | Kirino et al. | |
| 2021/0028528 | A1 | 1/2021 | Alexanian et al. | |

OTHER PUBLICATIONS

European Supplemental Search Report for Application No. EP22805077.9 dated Apr. 17, 2025 (12 pages).

Mu, Jing, et al. "Beam splitting of a novel triple-beam slot antenna array based on radial gap waveguide." Journal of Physics D: Applied Physics 53.31 (2020): 315102.

* cited by examiner

ROTATED RIDGE WAVEGUIDE ANTENNA

CROSS-REFERENCE TO RELATED APPLICATIONS

This application is a U.S. national counterpart application of International Application Serial No. PCT/SE2022/050494, filed May 19, 2022, which claims priority to and the benefit of Swedish Patent Application No. 2130135-3, filed May 20, 2021, the content of each which is incorporated by reference herein in its entirety.

TECHNICAL FIELD

The present disclosure relates to waveguide antenna arrays and related methods. The disclosed antenna array is suited for use in, e.g., telecommunication and radar transceivers.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. A radar transceiver is also a radio frequency transceiver since it transmits and receives radio frequency (RF) signals, i.e., electromagnetic signals.

The radiation arrangement of a transceiver often comprises an antenna array, since an array allows high control of shaping the radiation pattern, e.g., for high directivity, beam steering, and/or multiple beams. Antenna arrays can be based on slotted waveguide antennas (SWG), which comprise a compact integrated feed network with low loss and matching capabilities. Manufacturing tolerances, however, become problematic as the frequency increases since the physical dimensions of the antenna decreases. This is especially problematic at millimeter wave frequencies. To overcome this, the feed network can be based on electromagnetic bandgaps, e.g., ridge gap waveguides.

WO2021016218A1 discloses slot ridge waveguide antenna arrangements with 0 degree linear polarization with respect to the slot columns, or circular polarization, where the ridges are formed that bend, curve, stagger, or otherwise meander, from one side of a waveguide groove to the other side in a repeating pattern along the length of the waveguide groove.

US2018/0301819A1 discloses a slot antenna using a ridge gap waveguide.

Array antennas with 45 degree linear polarization with respect to the slot columns present a promising architecture for automotive radar systems since any interference arising from cars coming from the opposite direction is orthogonal.

However, there is a need for antenna arrangements with higher performance which are also easy to manufacture.

SUMMARY

It is an object of the present disclosure to provide improved antenna arrangement, which, i.a., are easy to manufacture.

This object is at least in part obtained by an antenna arrangement for an array antenna, the antenna arrangement having a stacked layered structure. The antenna arrangement comprises a radiation layer comprising a first slot and a second slot extending along a first slot axis and second slot axis, respectively. The first and the second slots are arranged in a column extending along a column axis. The slot axes are arranged at respective non-zero third and fourth angles with respect to the column axis. The antenna arrangement further comprises a distribution layer facing the radiation layer. The distribution layer comprises a first ridge waveguide comprising a first ridge and a second ridge waveguide comprising a second ridge. The first and second waveguides are arranged to distribute a radio frequency signal to the first and second slots, respectively, from a distribution layer feed arranged between the first and second ridges. Here, waveguiding paths of the first and second waveguides are configured to match respective shapes of the first and second ridges. Furthermore, a first section of the first ridge facing the first slot extends along a first ridge axis and a second section of the second ridge facing the second slot extends along a second ridge axis, where the ridge axes are arranged at respective non-zero first and second angles with respect to the column axis. The first and second angles are configured to match the third and fourth angles, respectively.

The disclosed antenna arrangement has the ridges and corresponding waveguides arranged to match the orientation of the slots, where the slots are angled with respect to the column axis. The antenna arrangement is suitable for array antennas with 45 degree linear polarization with respect to the column axis. This eliminates the need for a cavity layer arranged to rotate the electromagnetic field between the ridge and a slot altogether. This reduces complexity and saves costs. Furthermore, having the waveguiding paths match the respective shapes of the ridges provides a more constant characteristic impedance of the waveguide along the path compared to a straight waveguide. This provides substantially better electromagnetic coupling from the waveguides to the respective slots. This, in turn, enables a better control of the radiation pattern, e.g., to reduce ripple.

According to aspects, a distance from a side wall to the ridge in one of the ridge waveguides, measured in a cross section the waveguide, varies less than 30 percent, preferably less than 20 percent, and more preferably less than 10 percent, along the ridge waveguide. This provides better impedance matching along the waveguide. In other words, the side walls extend along the same or in a similar direction as the extension direction (or tangent) of a section of the ridge. Preferably, the distances between the ridge and the side wall on respective sides of ridge are equal, i.e., at a particular point along the ridge, the distance from the ridge to the side wall on one side is equal to the distance from the ridge to the side wall on the other side. This provides a symmetry to the ridge waveguide, which is an advantage. Measuring the distance in a cross section the waveguide can be described as the having the distance between the side wall and the ridge measured along the surface of the distribution layer and substantially perpendicular to a tangent of the ridge.

According to aspects, the third angle differs from the fourth angle by less than 45 degrees, preferably less than 20 degrees, and more preferably less than 5 degrees. In other words, the first and second slots extend in substantially similar directions. This way, the respective waves radiated from the slots have similar polarization, which is an advantage.

According to aspects, the first angle differs from the third angle by less than 20 degrees, preferably less than 10 degrees, and more preferably less than 5 degrees. According to further aspects, the second angle differs from the fourth angle less than 20 degrees, preferably less than 10 degrees, and more preferably less than 5 degrees. In other words, the first and second sections of the ridges extend in similar directions as the respective slots. This way, the electromagnetic is effectively coupled from the ridges to the respective slots.

According to aspects, wherein the third and fourth angles are within respective ranges of 20 to 70 degrees, preferably 30 to 60 degrees, and more preferably 40 to 50 degrees. An antenna arrangement with substantially 45 degree linear polarization is highly desirable in, e.g., automotive radars.

According to aspects, a first center of the first slot is arranged offset from the first ridge axis, and a center of the second slot is arranged offset from the second ridge axis. This way, the slots may be fed with a similar phase of the RF-signal from the respective ridge waveguides. Furthermore, the amount of offset of each slot can be selected for minimal sidelobe levels.

According to aspects, a first center of the first slot is arranged offset from the column axis, and a center of the second slot is arranged offset from the column axis. This offset can be selected for a more uniform radiation pattern for different angles, i.e., the radiation pattern in the azimuth dimension is uniform for different elevation angels, and vice versa.

According to aspects, a first ridge connection point of the first ridge is arranged offset from the column axis, and a second ridge connection point of the second ridge is arranged offset from the column axis, wherein the first and second ridge connection points are arranged to in connection the distribution layer feed. This may facilitate offsetting the first and second slots in different directions without changing the distance between slots, which is an advantage.

According to aspects, the distance between the geometrical centers of the first and the second slots is within 30 percent of a half a guide wavelength of a center frequency in a band of operation, preferably within 20 percent, and more preferably within 10 percent. This way, the respective electromagnetic radiation from the first and second slots can add up constructively in phase.

According to aspects, the antenna arrangement comprises a printed circuit board (PCB) layer and a shield layer, wherein the PCB layer comprises at least one PCB layer feed and faces the distribution layer and the shield layer faces the PCB layer. This provides an antenna arrangement with a high level of integration, which is an advantage.

According to aspects, the distribution layer comprises a metamaterial structure, wherein the first and second ridges and the metamaterial structure are arranged to form respective ridge gap waveguides intermediate the distribution layer and the radiation layer. Gap waveguide technology allows compact designs, low loss, low leakage between adjacent waveguides, and forgiving manufacturing and assembling tolerances. Furthermore, using such technology, there is no need for electrical contact between the radiation layer and the distribution layer. This is an advantage since high precision assembly is not necessary and since electrical contact need not be verified.

According to aspects, the metamaterial structure comprises a repetitive structure of protruding elements. This structure is easy to manufacture and enables good gap waveguide performance.

There is also disclosed herein an array antenna arrangement comprising a plurality of antenna arrangements according to the discussion above.

There is also disclosed herein an array antenna arrangement comprising a first and a second antenna arrangement according to the discussion above. In this array, the first ridge axis of the first antenna arrangement is parallel to and adjacent to the second ridge axis of the second antenna arrangement, wherein a protruding pin is arranged between the first ridge of the first antenna arrangement and the second ridge of the second antenna arrangement, and where that protruding pin is arranged equidistant between the first ridge axis of the first antenna arrangement and the second ridge axis of the second antenna arrangement. This can enable a uniform distribution of the pins, and enables a periodic placement of the pins in the array. This in turn provides a more constant characteristic of the waveguide along the waveguide paths. This provides substantially better electromagnetic coupling from the waveguides to the respective slots. This, in turn, enables a better control of the radiation pattern, e.g., to reduce ripple.

There is also disclosed herein a telecommunication or radar transceiver comprising the antenna arrangement according to the discussion above.

There is also disclosed herein a vehicle comprising the antenna arrangement according to the discussion above.

There is also disclosed herein a method for designing an antenna arrangement having a stacked layered structure. The antenna arrangement comprises a radiation layer and a distribution layer facing the radiation layer. The method comprises:

- arranging a first and a second slot to extend along a first slot axis and second slot axis, respectively, and to be in a column extending along a column axis, and where the slot axes are arranged at respective non-zero third and fourth angles with respect to the column axis;
- arranging a first ridge waveguide comprising a first ridge and a second ridge waveguide comprising a second ridge on the distribution layer to distribute a radio frequency signal to the first and second slots, respectively, from a distribution layer feed arranged between the first and second ridges, wherein waveguiding paths of the first and second waveguides are configured to match respective shapes of the first and second ridges; and
- arranging a first section of the first ridge to face the first slot and to extend along a first ridge axis and a second section of the second ridge to face the second slot and to extend along a second ridge axis, where the ridge axes are arranged at respective non-zero first and second angles with respect to the column axis, where the first and second angles are configured to match the third and fourth angles, respectively.

The methods disclosed herein are associated with the same advantages as discussed above in connection to the different apparatuses. There are furthermore disclosed herein control units adapted to control some of the operations described herein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1A:
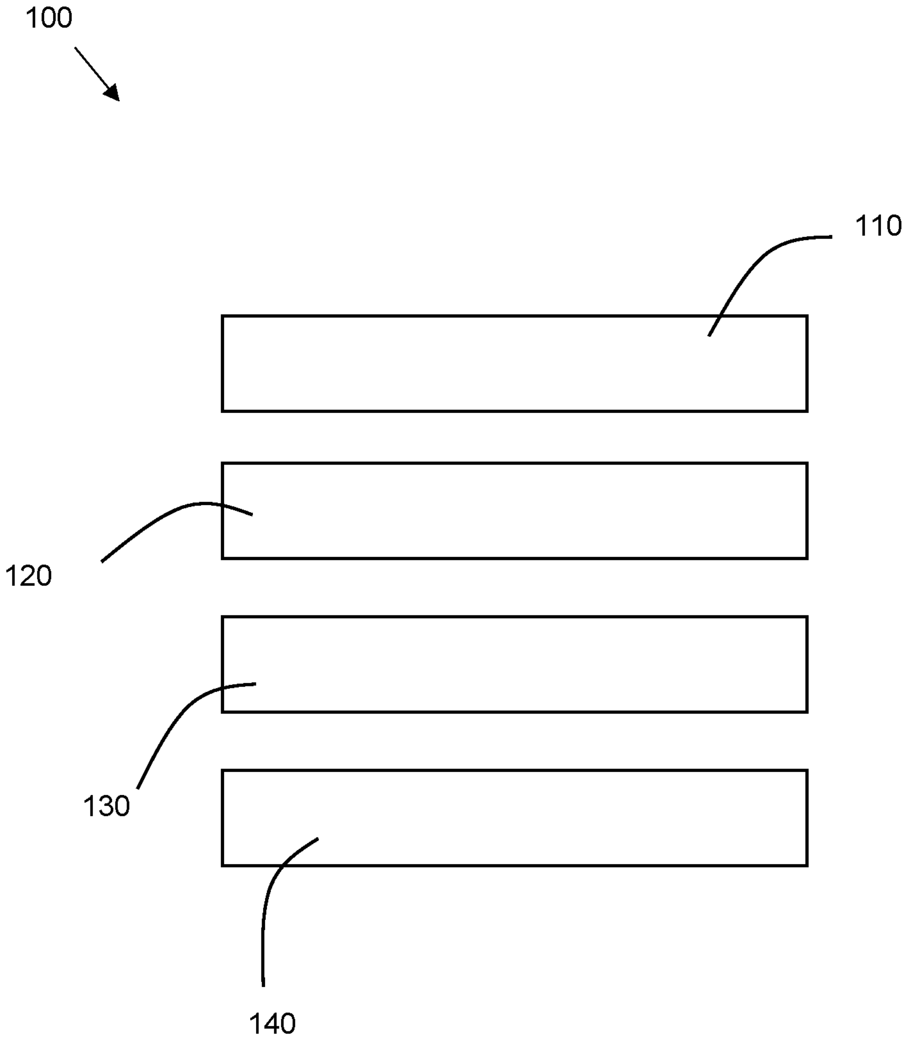
FIG. 1A shows an example antenna arrangement.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1A shows an antenna arrangement 100 according to the present disclosure having a stacked layered structure. A stacked layered structure is a structure comprising a plurality of planar elements referred to as layers. Each planar element has two sides, or faces, and is associated with a thickness. The thickness is much smaller than the dimension of the faces, i.e., the layer is a flat or approximately planar element. According to some aspects, a layer is rectangular or square. However, more general shapes are also applicable, including circular or elliptical disc shapes. The stacked layered structure is stacked in the sense that layers are arranged on top of each other. In other words, the layered structure can be seen as a sandwich structure.

The disclosed antenna arrangements 100 may be used for radar transceivers, such as vehicle radar transceivers, or for other radio frequency applications, such as communication systems, positioning systems etc. Therefore, there is disclosed herein a telecommunication or radar transceiver comprising the antenna arrangement 100. There is also disclosed herein a vehicle comprising the disclosed antenna arrangements 100.

The antenna arrangement in FIG. 1A comprises a radiation layer 110 with a plurality of slots 111,112 (not shown in FIG. 1A) and a distribution layer 120. In general, the distribution layer 120 distributes one or more radio frequency signals to and from the slots. Generally, the stacked layered structure antenna arrangement may comprise a printed circuit board (PCB) layer 130 and a shield layer 140.

The disclosed antenna arrangement is based on a ridge waveguide, as is shown in FIGS. 1B-1E. These particular examples comprise a plurality slots 111, 112. Pairs of slots are arranged in respective columns 115. The column has an elongated shape and extends in a column axis D5. Each slot in the column is fed from a respective ridge waveguide arranged in the distribution layer. A distribution layer feed is arranged in between the respective ridges. In general slot antenna arrangements based on ridge waveguides, the slots are preferably arranged facing the edge of the ridge to be effectively excited. However, the slots may be arranged adjacent to the ridge.

The slots are commonly rectangular or elliptical with a length about half the free-space wavelength, and with a width substantially shorter than the length, e.g., a tenth of the length. Other slot shapes that are substantially rectangular are also possible, e.g., a dumbbell shape.

To control the electromagnetic coupling into each slot from a radio frequency (RF) signal along the waveguide, each slot may be individually displaced from a centerline along the broadside of the waveguide, i.e., arranging the center of each slot at a distance from the centerline, and individually displaced from the center of the ridge. This can also be seen as controlling the matching between the waveguide and the slot. The excitation to each slot, i.e., the coupling to each slot, affects, i.a, the side lobe level (SSL) in the radiation pattern from the array of slots in the waveguide. The far field radiation pattern of an antenna arrangement typically comprises a main lobe, which is a global maximum, i.e., a lobe continuing the highest power. A sidelobe is a lobe associated with a local maximum.

Figure 1B:
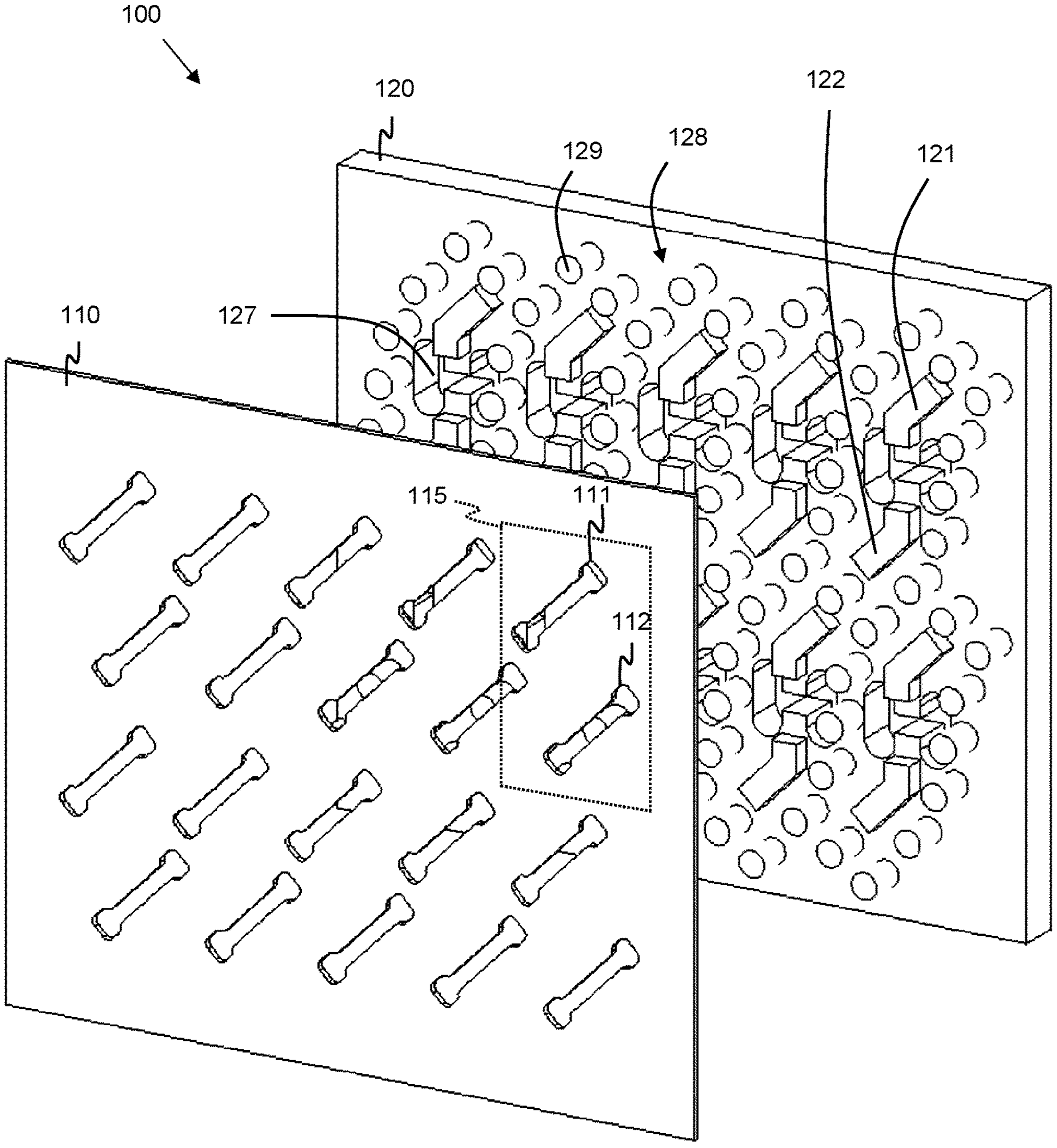
FIG. 1B shows an exploded view of an example antenna arrangement.
Figure 1C:
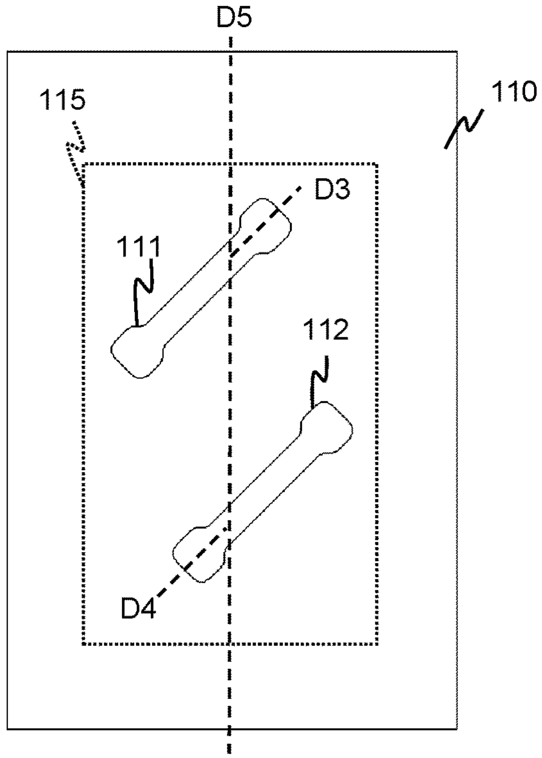
FIG. 1C shows a top view of view of an example radiation layer.
Figure 1D:
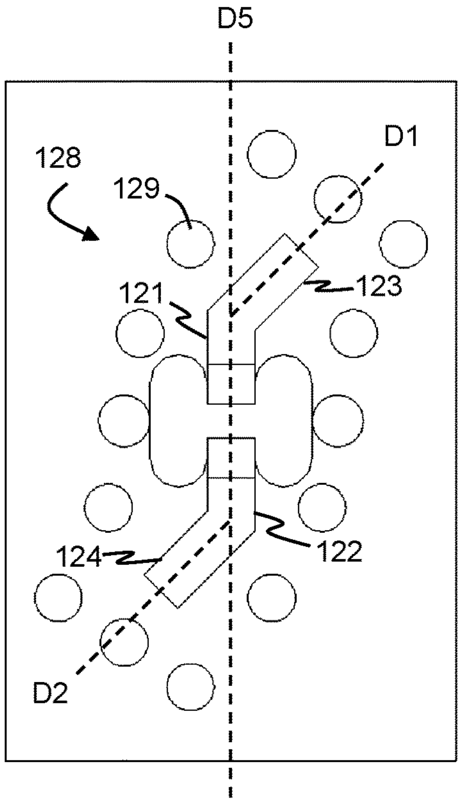
FIG. 1D shows a top view of view of an example distribution layer.
Figure 1E:
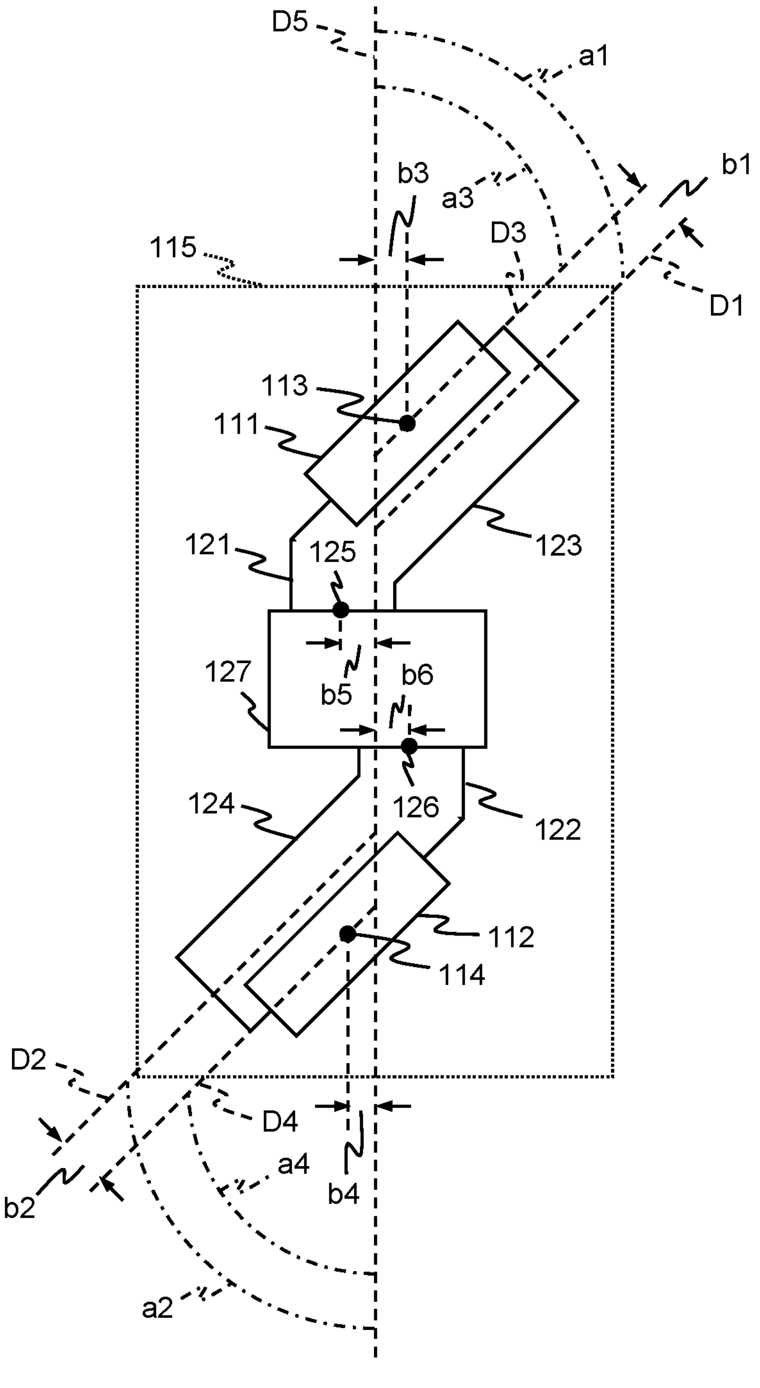
FIG. 1E shows an example antenna arrangement.

The slots in the example of in FIG. 1B are rotated 45 degrees with respect to a column axis D5 in the extension direction of the column. FIGS. 1C and 1D show detailed top views of the radiation layer and the distribution layer, respectively, of one column in the array antenna of FIG. 1B. FIG. 1E shows a schematic view of the distribution layer and corresponding slots of one column. The array antenna of FIG. 1B comprises a 4 by 2 grid of the columns. Array antennas comprised in prior art utilize commonly a cavity layer intermediate the distribution layer and the radiation layer, and a distribution layer comprising ridges extending along the column axis D5. To rotate the polarization of the electromagnetic field by 45 degrees in such arrangements, a cavity layer must be used. The cavity layer, however, is complicated to manufacture since it often requires machining on both sides.

WO2021016218A1 discloses a slot ridge waveguide antenna arrangement with circular polarization, where the ridge is arranged to meander back and forth across a straight waveguide groove along the axis of the waveguide groove in a periodic, zig-zag or sawtooth pattern. The antenna arrangement of that document comprises polarizing slots formed in pairs that are orthogonal, or at least substantially orthogonal, to each other. However, the impedance matching of the waveguide is poor in such a solution since the relative position of the ridge in the waveguide groove/path varies along the waveguide. At one point in the waveguide, the ridge is close to a side wall, and at another point, the ridge is arranged in the center. This results in that the characteristic impedance of the waveguide varies along the waveguide path, and results in poor electromagnetic coupling to the respective slots. This, in turn, results in an undesired radiation pattern. Furthermore, that document does not disclose anything about how the phases of the electromagnetic signal fed into respective slots should add up for anything but circular polarization, nor any other arrangement than the pair of orthogonal polarizing slots.

US2018/0301819A1 discloses a slot antenna using a ridge gap waveguide, see, e.g., FIG. 11A-11D in that document. In that document, pairs of slots are arranged to add up in phase to generate an effective linear polarization for the pair of slots, where the angle of the polarization relative to the column axis is adjusted by the distance between the slots in the pair. The document discloses that the distance between the slots should be about half a guide wavelength to generate an effective 90 degree polarization with respect to the column axis for the pair of slots. Here the distance is measured along the waveguide. The distance can be larger to generate effective polarization angles for the pair of slots less than 90 degrees. However, in an array comprising a plurality of such pairs, the distance between the pairs would be in the order of a full guide wavelength or larger, which makes it unsuitable for an array antenna for beam steering without grading lobes. This is because the distance between slots with the same orientation (or substantially the same orientation) should have a distance less than half the free space wavelength in an array antenna to avoid grating lobes. Here the distance is measured along the radiation layer.

The antenna arrangement disclosed in WO2021016218A1 is also not suitable for an array antenna for beam steering without grading lobes.

The disclosed antenna arrangement, on the other hand, is an arrangement suitable for linear 45 degree polarization with respect to a column axis and is suitable for an array antenna capable of beam steering without grating lobes. More specifically, there is disclosed herein an antenna arrangement 100 for an array antenna, the antenna arrangement having a stacked layered structure. The antenna arrangement comprises a radiation layer 110 comprising a first slot 111 and a second slot 112 extending along a first slot axis D3 and second slot axis D4, respectively. The first and the second slots are arranged in a column 115 extending along a column axis D5. The slot axes are arranged at respective non-zero third and fourth angles a3, a4 with respect to the column axis. The antenna arrangement further comprises a distribution layer 120 facing the radiation layer 110. The distribution layer comprises a first ridge waveguide comprising a first ridge 121 and a second ridge waveguide comprising a second ridge 122. The first and second waveguides are arranged to distribute a radio frequency signal to the first 111 and second slots 112, respectively, from a distribution layer feed 127 arranged between the first 121 and second ridges 122. Here, waveguiding paths 201, 202 of the first and second waveguides are configured to match respective shapes of the first and second ridges. Furthermore, a first section 123 of the first ridge 121 facing the first slot 111 extends along a first ridge axis D1 and a second section 124 of the second ridge 122 facing the second slot 112 extends along a second ridge axis D2, where the ridge axes are arranged at respective non-zero first and second angles a1, a2 with respect to the column axis. The first and second angles a1, a2 are configured to match the third and fourth angles a3, a4, respectively.

The disclosed antenna arrangement has the ridges and corresponding waveguides to match the orientation of the slots, where the slots are angled with respect to the column axis. This eliminates the need for a cavity layer arranged to rotate the electromagnetic field between the ridge and a slot altogether. This reduces complexity and saves costs. Furthermore, having the waveguiding paths match the respective shapes of the ridges provides a more constant characteristic of the waveguide along the path compared to a straight waveguide. This provides substantially better electromagnetic coupling from the waveguides to the respective slots. This, in turn, enables a better control of the radiation pattern, e.g., to reduce ripple. In addition, the disclosed antenna arrangement is suitable for linear 45 degree polarization with respect to the column axis and is suitable for an array antenna comprising a plurality of the antenna arrangements 100, where the array antenna is capable of beam steering without grating lobes.

Figure 2A:
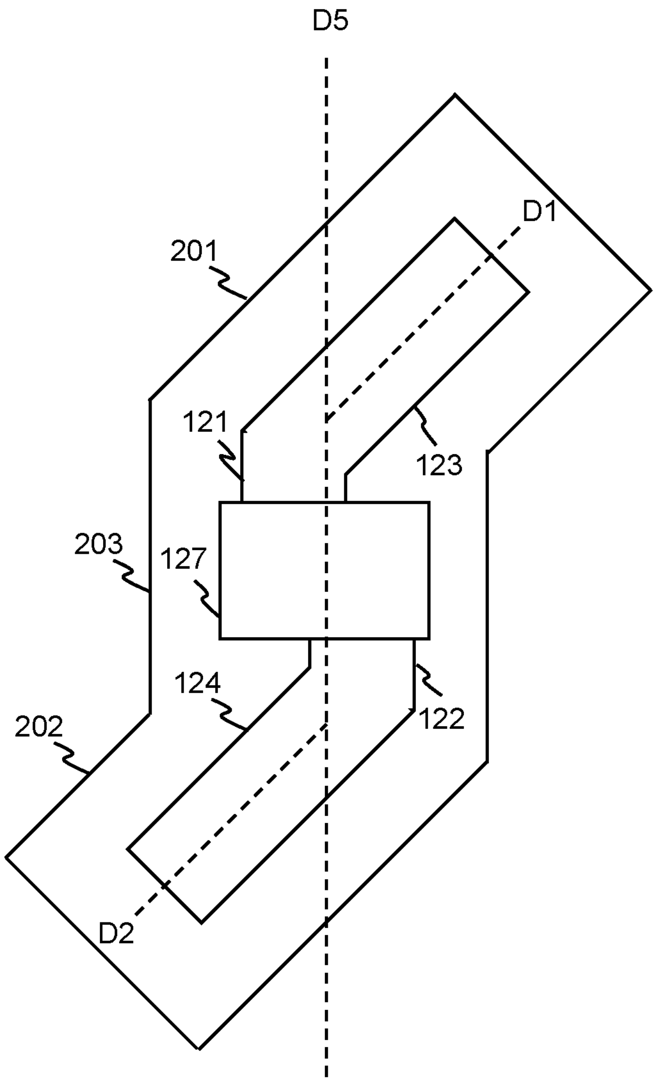
FIGS. 2A-2B show an example distribution layers.
Figure 2B:
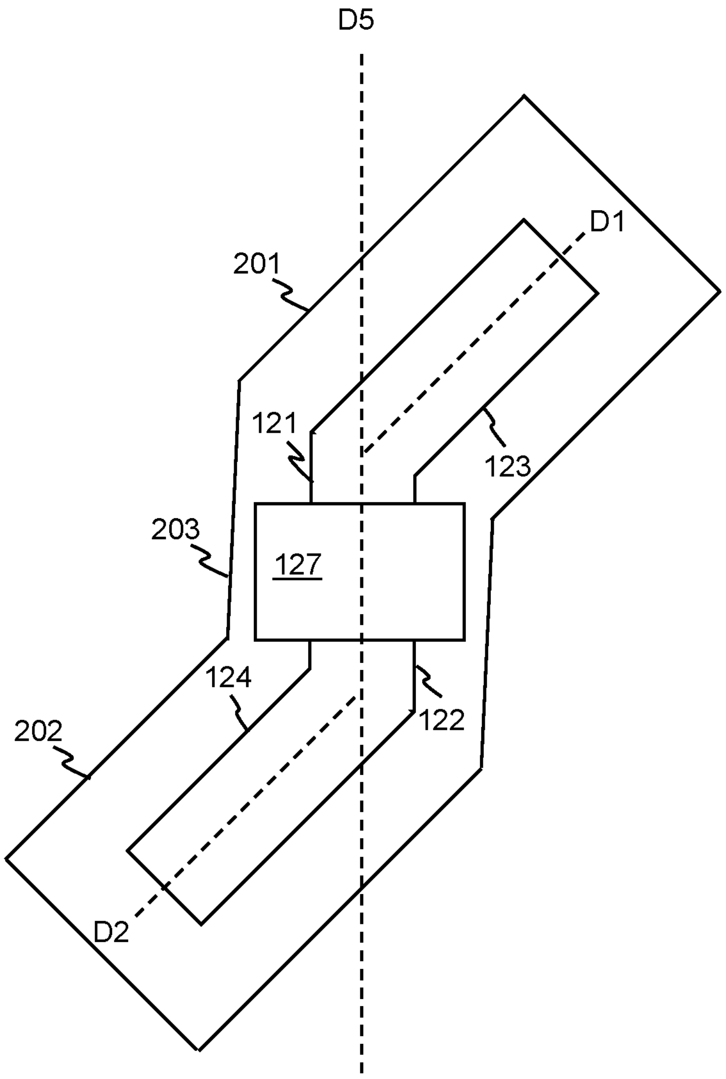

In FIGS. 1B-1D, the ridge waveguides are gap waveguides comprising protruding elements as side walls, which is discussed in more detail below. The ridge waveguides can be other types of ridge waveguides as well, such as a rectangular waveguide with a ridge. FIGS. 2A and 2B show schematic illustrations of the position of the ridge in relation to the waveguiding paths 201, 202. The side walls of the waveguiding path (i.e., the path along which the electromagnetic wave is guided) can be comprised of a conductive wall, as in a rectangular waveguide, or a metamaterial structure, like the protrusions in FIGS. 1B-1D. The side walls are the structures confining the wave along the surface of the distribution layer.

In FIG. 2A, the first waveguiding path 201 is connected to the second waveguiding path 202 by a straight waveguiding path 203 extending along the column axis D5. In FIG. 2B, the first waveguiding path 201 is connected to the second waveguiding path 202 by a straight waveguiding path 203 extending angled with respect to the column axis D5. In FIG. 2B, the respective centers of the ridges are arranged at the center of the distribution layer feed, whereas they are arranged offset from that center in FIG. 2A.

In FIG. 2A, the first section 123 of the first ridge 121 is arranged in the center of the first waveguiding path 201 for a large portion of the first ridge waveguide. In FIG. 2B, this is true for an even larger portion. This can also be described by the shape of the first waveguiding path 201 being configured to match the shape of the first ridge. In other words, the side walls extend along the same or in a similar direction as the extension direction (or tangent) of a section of the ridge.

In the examples of FIGS. 2A and 2B, the non-uniform position of the ridge in relation to the waveguiding path comes from the transition from the (first or second) section of the ridge to the connection point to the distribution layer feed. Preferably, the distances between the ridge and the side wall on respective sides of ridge are equal, i.e., at a particular point along the ridge, the distance from the ridge to the side wall on one side is equal to the distance from the ridge to the side wall on the other side. This provides a symmetry to the ridge waveguide. To summarize, according to aspects, a distance from a side wall to the ridge in one of the ridge waveguides, measured in a cross section the waveguide, varies less than 30 percent, preferably less than 20 percent, and more preferably less than 10 percent, along the ridge waveguide. Measuring the distance in a cross section the waveguide can be described as the having the distance between the side wall and the ridge measured along the surface of the distribution layer 130 and substantially perpendicular to a tangent of the ridge.

The ridge may have a rectangular cross section, but more general shapes are possible, such as a cross section with a half-circle shape.

As mentioned, the slots normally have a rectangular shape, or some other elongated shape like a dumbbell. In a linearly polarized array antenna, two or more of slots extend in a similar directions (i.e., respective slot axes) to align the polarization of the respected radiated waves form the slots. Therefore, the first and second slots of the disclosed antenna arrangement preferably extend in substantially similar directions. In other words, according to aspects, the third angle a3 differs from the fourth angle a4 by less than 45 degrees, preferably less than 20 degrees, and more preferably less than 5 degrees.

The first and second sections of the ridges facing the slots are typically elongated sections with respective ridge axes that extend in similar directions as the respective slots to effectively couple the electromagnetic radiation to the slots. In other words, the first and second angles a1, a2 are configured to match the third and fourth angles a3, a4, respectively. According to aspect, the first angle a1 differs from the third angle a3 by less than 20 degrees, preferably less than 10 degrees, and more preferably less than 5 degrees. A similar relationship between the second ridge and the second slot is also preferred, i.e., according to aspects, the second angle a2 differs from the fourth angle a4 less than 20 degrees, preferably less than 10 degrees, and more preferably less than 5 degrees.

As mentioned, the disclosed arrangement is arranged to transmit linearly polarized waver at an angle with respect to the column axis. According to aspects, the third and fourth angles a3, a4 are within respective ranges of 20 to 70 degrees, preferably 30 to 60 degrees, and more preferably 40 to 50 degrees.

The distribution layer feed 127 may be a thru hole to the other side of the distribution layer. The shape of the thru hole and the shape of a part of the ridge adjacent to the thru hole can be adapted to optimize the electromagnetic coupling from the distribution layer feed to the ridge, i.e., to optimize matching. This part of the ridge may, e.g., comprise a stepped height impedance transformer. Other types of feeds are also possible, such as a coaxial to waveguide transition, or a feed ridge arranged to connect to the first and second ridges 121, 122.

To have the respective electromagnetic radiation from the first and second slots add up constructively in phase, the distance between the geometrical centers of the first and the second slots 111, 112 should be close to half a guide wavelength of a center frequency in a band of operation, which is the distance between two planes of equal phase along the waveguide. According to aspects, this distance is within 30 percent of a half a guide wavelength of a center frequency in a band of operation, preferably within 20 percent, and more preferably within 10 percent. According to aspects, this distance is measured along the waveguiding paths between the two slots, i.e., along the first and second waveguides and the path in between.

To feed the first and the second slots with a similar phase of the RF-signal from the respective ridge waveguides, the two slots should face opposite edges of the respective ridges. In other words, according to aspects, a first center 113 of the first slot 111 is arranged offset b1 from the first ridge axis D1, and a center 114 of the second slot 112 is arranged offset b2 from the second ridge axis D2. Here, a center normally means the geometrical center. As mentioned, these two centers are preferably offset in opposite directions. The amount of offset of each slot can be selected for minimal SSL. The two different slots could be arranged facing the same edge on the respective ridges, but must in that case be arranged two guide wavelengths apart to be fed with a similar phase. This, however, results in grating lobes and is therefore an unviable option.

According to aspects, a first center 113 of the first slot 111 is arranged offset b3 from the column axis D5, and a center 114 of the second slot 112 is arranged offset b4 from the column axis D5. Having the centers aligned with the column axis does not necessarily result in the best radiation pattern. In fact, arranging these centers offset in opposite direction from the column axis results in a more uniform radiation pattern for different angles, i.e., the radiation pattern in the azimuth dimension is uniform for different elevation angels, and vice versa.

The first and the second ridges may be arranged offset relative to each other relative the column axis. One way to achieve this is to arrange the respective parts of the ridges where they connect to the distribution layer feed, i.e., where they couple electromagnetic waves to the feed. These parts can be described as respective ridge connection point. For example, the connection point of a rectangular ridge can be the geometrical center of a cross section of the part of the ridge that is arranged directly in connection to the distribution layer feed. Therefore, according to aspects, a first ridge connection point 125 of the first ridge 121 is arranged offset b5 from the column axis D5, and a second ridge connection point 126 of the second ridge 122 is arranged offset b6 from the column axis D5. Here the first and second ridge connection points 126 are arranged to in connection the distribution layer feed 127. This may facilitate offsetting the first and second slots in different directions without changing the distance between slots, which is an advantage. These centers may be offset in opposite directions.

The ridge waveguides may be a ridge gap waveguides, which present compact designs, low loss, low leakage, and forgiving manufacturing and assembling tolerances. In this case, the distribution layer 120 comprises a metamaterial structure 128. The first and second ridges 121, 122 and the metamaterial structure are arranged to form respective ridge gap waveguides intermediate the distribution layer 120 and the radiation layer 110. The first metamaterial structure is arranged to prevent electromagnetic waves in a frequency band of operation from propagating in other directions than along the intended waveguiding paths. This type of distribution layer 120 is arranged with direct contact to the radiation layer 110 or is arranged at a distance from the radiation layer 110, where the distance is smaller than a quarter of a wavelength of a center frequency of operation of the antenna arrangement 100.

The metamaterial structure is arranged to form an electromagnetic bandgap (EBG). According to aspects, the metamaterial structure is arranged to form a high impedance surface, such as an artificial magnetic conductor (AMC). If the high impedance surface faces an electrically conductive surface (i.e., a low impedance surface such as a perfect electric conductor, PEC, in the ideal case), and if the two surfaces are arranged at a distance apart less than a quarter of a wavelength at a center frequency, no electromagnetic waves in a frequency band of operation can, in the ideal case, propagate along or between the intermediate surfaces since all parallel plate modes are cut-off in that frequency band. The center frequency is often in the middle of the frequency band of operation. In a realistic scenario, the electromagnetic waves in the frequency band of operation are attenuated per length along the intermediate surfaces. Herein, to attenuate is interpreted as to significantly reduce an amplitude or power of electromagnetic radiation, such as a radio frequency signal. The attenuation is preferably complete, in which case attenuate and block are equivalent, but it is appreciated that such complete attenuation is not always possible to achieve.

There exists a multitude of metamaterial structures. Such structures often comprise elements arranged in a periodic or quasi-periodic pattern in one, two or three dimensions. Herein, a quasi-periodic pattern is interpreted to mean a pattern that is locally periodic but displays no long-range order. A quasi-periodic pattern may be realized in one, two or three dimensions. As an example, a quasi-periodic pattern can be periodic at length scales below ten times an element spacing, but not at length scales over 100 times the element spacing.

A metamaterial structure may comprise at least two element types, the first type of element comprising an electrically conductive material and the second type of element comprising an electrically insulating material. Elements of the first type may be made from a metal such as copper or aluminum, or from a non-conductive material like PTFE or FR-4 coated with a thin layer of an electrically conductive material like gold or copper. Elements of the first type may also be made from a material with an electric conductivity comparable to that of a metal, such as a carbon nanostructure or electrically conductive polymer. As an example, the electric conductivity of elements of the first type can be above 103 Siemens per meter (S/m). Preferably, the electric conductivity of elements of the first type is above 105 S/m. In other words, the electric conductivity of elements of the first type is high enough that the electromagnetic radiation can induce currents in the elements of the first type, and the electric conductivity of elements of the second type is low enough that no currents can be induced in elements of the second type. Elements of the second type may optionally be non-conductive polymers, vacuum, or air. Examples of such non-conductive element types also comprise FR-4 PCB material, PTFE, plastic, rubber, and silicone.

Elements of the first and second type may be arranged in a pattern characterized by any of translational, rotational, or glide symmetry, or a periodic, quasi-periodic or irregular pattern.

The physical properties of the elements of the second type also determines the dimensions required to obtain attenuation of electromagnetic propagation past the metamaterial structure. Thus, if the second type of material is chosen to be different from air, the required dimensions of the first type of element changes.

The elements of the first type may be arranged in a periodic pattern with some spacing. The spaces between the elements of the first type constitute the elements of the second type. In other words, the elements of the first type are interleaved with elements of the second type. Interleaving of the elements of the first and second type can be achieved in one, two or three dimensions.

A size of an element of either the first or the second type, or both, is smaller than the wavelength in air of electromagnetic radiation in the frequency band. As an example, defining the center frequency as the frequency in the middle of the frequency band, the element size is between 1/5th and 1/50th of the wavelength in air of electromagnetic radiation at the center frequency. Here, the element size is interpreted as the size of an element in a direction where the electromagnetic waves are attenuated, e.g., along a surface that acts as a magnetic conductor. As an example, for an element comprising a vertical rod with a circular cross section and with electromagnetic radiation propagating in the horizontal plane, the size of the element corresponds to a length or diameter of the cross section of the rod.

A type of metamaterial structure comprises electrically conductive protrusions on an electrically conductive substrate. In other words, the metamaterial structure 128 of the disclosed antenna arrangement 100 may comprise a repetitive structure of protruding elements 129. The protrusions may optionally be encased in a dielectric material. It is appreciated that the protrusions may be formed in many different shapes, like a square, circular, elliptical, rectangular, or more generally shaped cross sections.

It is also possible that the protrusions are mushroom shaped, as in, e.g., a cylindrical rod on an electrically conductive substrate with a flat electrically conductive circle on top of the rod, wherein the circle has a cross section larger than the cross section of the rod, but small enough to leave space for the second element type between the circles in the metamaterial structures. Such a mushroom-shaped protrusion may be formed in a printed circuit board, wherein the rod comprises a via hole, which may or may not be filled with electrically conductive material.

The protrusions have a length in a direction facing away from the electrically conductive substrate. In general, if the element of the second type is air, the protrusion length corresponds to a quarter of the wavelength in air at the center frequency. The surface along the tops of the protrusions is then close to a perfect magnetic conductor at the center frequency. Even though the protrusions are only a quarter wavelength long at a single frequency, it presents a high impedance surface at a frequency band around that single frequency. This type of metamaterial structure thus presents a band of frequencies where electromagnetic waves may be attenuated, when the metamaterial structure faces a low impedance surface. In a non-limiting example, the center frequency is 15 GHZ and electromagnetic waves in the frequency band 10 to 20 GHz propagating intermediate the metamaterial structure and an electrically conductive surface are attenuated.

As another example, a type of metamaterial structure comprises a single slab of electrically conductive material into which cavities have been introduced. The cavities may be air-filled or filled with a non-conductive material. It is appreciated that the cavities may be formed in different shapes such as elliptical, circular, rectangular, or more general cross section shapes. In general, the length (in a direction facing away from the electrically conductive substrate) corresponds to a quarter of the wavelength at the center frequency.

As show in FIG. 1A, the antenna arrangement 100 optionally comprises a printed circuit board (PCB) layer 130 and a shield layer 140. The PCB layer comprises at least one PCB layer feed. The PCB layer comprises at least one PCB layer feed and faces the distribution layer 120 and the shield layer faces the PCB layer.

The PCB layer 130 optionally comprises at least one RF integrated circuit (IC) arranged on either or both sides of the PCB layer. The at least one PCB layer feed may be arranged to transfer radio frequency signals from the RF IC(s) to an opposite side of the PCB, into the distribution layer. According to an example, the at least one PCB layer feed is a through hole connected to a corresponding opening in the distribution layer 120, wherein the through hole is fed by at least one microstrip line. Alternatively, or in combination of, the at least one PCB layer feed may be arranged to transfer radio frequency signals from RF IC(s) on the side of the PCB facing the distribution layer into the distribution layer. According to aspects, at least one PCB layer feed is arranged to transfer radio frequency signals away from the antenna arrangement 100, to, e.g., a modem.

The shield layer 140 optionally comprises a second metamaterial structure arranged to form at least one second waveguide intermediate the shield layer 140 and the PCB layer 130. The second metamaterial structure is also arranged to prevent electromagnetic waves in a frequency band of operation from propagating from the at least one second waveguide in directions other than through the at least one PCB layer feed. The second metamaterial structure allows a compact design with low loss and low leakage, i.e., unwanted electromagnetic propagation between, e.g., adjacent waveguides or between adjacent RFICs. Furthermore, the second metamaterial structure shields the PCB layer from electromagnetic radiation outside of the antenna arrangement.

The second metamaterial structure optionally comprises a repetitive structure of protruding elements, and the PCB layer optionally comprises a ground plane and at least one planar transmission line, thereby forming at least one second gap waveguide intermediate the shield layer 140 and the PCB layer 130. The at least one second gap waveguide may, e.g., be an inverted microstrip gap waveguide. The shield layer may comprise different types of protruding elements. For example, narrow and tall pins may be used to form the second waveguide. Wider and shorter pins may be adapted to fit RFICs between the shield layer and the PCB layer. Such pins may contact RFICs for heat transfer purposes.

According to aspects, the distribution layer 120 comprises a third metamaterial structure, which is arranged on the opposite side of the first metamaterial structure 125, i.e., the third metamaterial structure faces the PCB layer 130. This way, gap waveguides may be formed intermediate the distribution layer 120 and the PCB layer 130. These gap waveguides may be used for coupling electromagnetic signals between RFICs on the PCB layer 130 and the PCB layer feeds. The third metamaterial structure allows a compact design with low loss and low leakage, i.e. unwanted electromagnetic propagation between, e.g., adjacent waveguides or between adjacent RFICs. Furthermore, the third metamaterial structure shields the PCB layer from electromagnetic radiation outside of the antenna arrangement. The third metamaterial structure may comprise different pins.

There is also disclosed herein an array antenna arrangement comprising a plurality of antenna arrangements 100 according to the discussions above.

Figure 3:
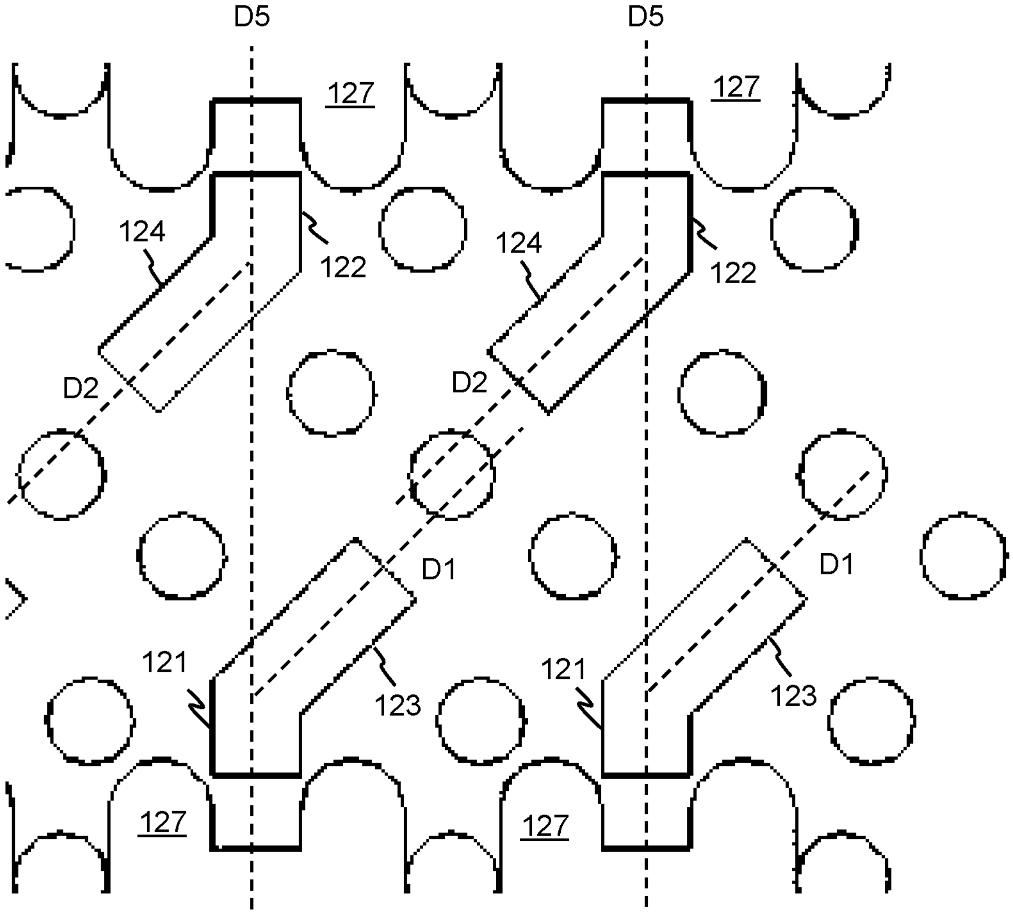
FIG. 3 shows a top view of view of an example distribution layer.

FIG. 3 shows a part of an example embodiment of an array antenna arrangement with four antenna arrangements 100. It is desired to maintain periodicity of the pins as much as possible, while at the same time keeping desired distances between the slots in the array. The desired distances between the slots on the radiation layer should be equal or less than half a free space wavelength at a center frequency of operation to avoid grating lobes. Here, the distance is measured along the radiation layer. One way to keep distances and periodicity of the pins is to arrange the pin between the short sides of two adjacent ridges in between their respective axes. This leads to a slightly non-uniform distribution of the pins around one ride, but may facilitate keeping the overall periodicity of the pins in the array.

In a ridge gap waveguide comprising pins, it is normally preferable to terminate the end of a ridge (the short side) with a pin centered in the extension direction of end-section of the ridge. If that pin is offset from that extension direction, i.e., offset from the center of the ride at the end-section, there will be an asymmetry in the pin arrangement around the ridge, which may cause a varying waveguide impedance along the ridge, which is undesired. In an array comprising straight ridges in relation to the column axes, it is normally easy to maintain periodic pin arrangement around the respective ridges, where all ridges are terminated with respective pins centered in the extension direction of the respective end-sections. In an array antenna comprising ridges that are angled with respect to the column axes, however, it may be challenging to maintain periodicity of the pin arrangement, i.e., the pins surrounding the ride of one antenna arrangement may interfere with the pins of an adjacent antenna arrangement.

The arrangement in the array should be spaced close together to avoid grating lobes. This, in combination with normal dimension of the pins in ridge gap waveguides, normally results in that only one row of pins can be arranged between ridges of adjacent antenna arrangements, i.e., a single row of pins is shared between two ridges, and that single row of pin constitute the side walls for the respective ridges. For this reason, it is important to maintain a periodicity of the pins in order to keep all antenna arrangements equal.

According to aspect, the present disclosure terminates the ridges of an array antenna comprising pin-based ridge gap waveguides to maintain periodicity of the pins. To summarize, there is also disclosed herein an array antenna arrangement comprising a first and a second antenna arrangement 100, which are based on gap waveguide technology using protrusions. The first ridge axis D1 of the first antenna arrangement is parallel to and adjacent to the second ridge axis D2 of the second antenna arrangement. A protruding pin is arranged between the first ridge of the first antenna arrangement and the second ridge of the second antenna arrangement. Furthermore, that protruding pin is arranged equidistant between the first ridge axis D1 of the first antenna arrangement and the second ridge axis D2 of the second antenna arrangement. This can enable a uniform distribution of the pins for all waveguides in the array, which in turn provides a more constant characteristic of the waveguides along the respective waveguide paths. This provides substantially better electromagnetic coupling from the waveguides to the respective slots. This, in turn, enables a better control of the radiation pattern, e.g., to reduce ripple.

Figure 4:
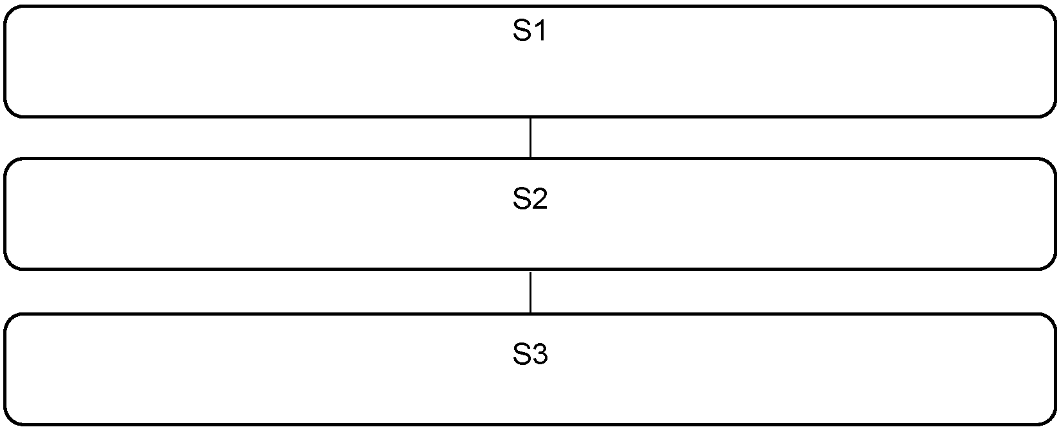
FIG. 4 is a flow chart illustrating methods.

With reference to FIG. 4, there is also disclosed herein a method for designing an antenna arrangement 100 for an array antenna, the antenna arrangement having a stacked layered structure. The antenna arrangement comprises a radiation layer 110 and a distribution layer 120 facing the radiation layer 110. The method comprises:

- arranging S1 a first 111 and a second slot 112 to extend along a first slot axis D3 and second slot axis D4, respectively, and to be in a column 115 extending along a column axis D5, and where the slot axes are arranged at respective non-zero third and fourth angles a3, a4 with respect to the column axis;
- arranging S2 a first ridge waveguide comprising a first ridge 121 and a second ridge waveguide comprising a second ridge 122 on the distribution layer 120 to distribute a radio frequency signal to the first 111 and second slots 112, respectively, from a distribution layer feed 127 arranged between the first 121 and second ridges 122, wherein waveguiding paths of the first and second waveguides are configured to match respective shapes of the first and second ridges; and
- arranging S3 a first section 123 of the first ridge 121 to face the first slot 111 and to extend along a first ridge axis D1 and a second section 124 of the second ridge 122 to face the second slot 112 and to extend along a second ridge axis D2, where the ridge axes are arranged at respective non-zero first and second angles a1, a2 with respect to the column axis, where the first and second angles a1, a2 are configured to match the third and fourth angles a3, a4, respectively.

Figure 5:
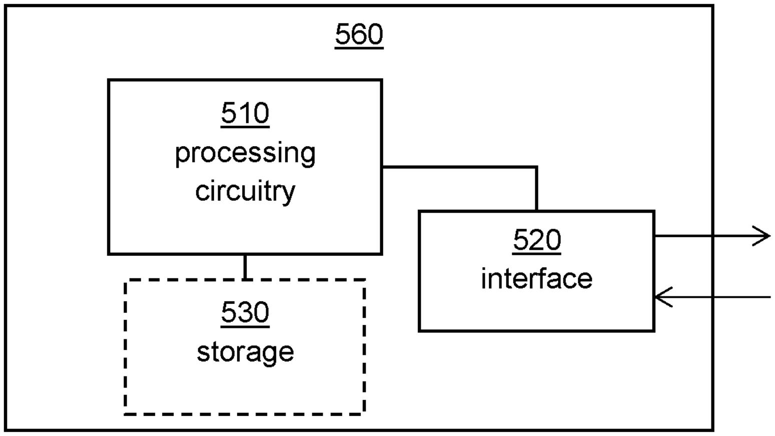
FIG. 5 shows an example control unit.

FIG. 5 schematically illustrates, in terms of a number of functional units, the components of a control unit 560. Processing circuitry 510 is provided using any combination of one or more of a suitable central processing unit CPU, multiprocessor, microcontroller, digital signal processor DSP, etc., capable of executing software instructions stored in a computer program product, e.g., in the form of a storage medium 530. The processing circuitry 510 may further be provided as at least one application specific integrated circuit ASIC, or field programmable gate array FPGA.

Particularly, the processing circuitry 510 is configured to cause the control unit 560 to perform a set of operations, or steps, such as the methods discussed in connection to FIG. 4. For example, the storage medium 530 may store the set of operations, and the processing circuitry 510 may be configured to retrieve the set of operations from the storage medium 530 to cause the control unit 560 to perform the set of operations. The set of operations may be provided as a set of executable instructions.

Thus, the processing circuitry 510 is thereby arranged to execute methods as herein disclosed.

The storage medium 530 may also comprise persistent storage, which, for example, can be any single one or combination of magnetic memory, optical memory, solid state memory or even remotely mounted memory.

The control unit 560 may further comprise an interface 520 for communications with at least one external device. As such the interface 520 may comprise one or more transmitters and receivers, comprising analogue and digital components and a suitable number of ports for wireline or wireless communication.

The processing circuitry 510 controls the general operation of the control unit 560 e.g., by sending data and control signals to the interface 520 and the storage medium 530, by receiving data and reports from the interface 520, and by retrieving data and instructions from the storage medium 530. Other components, as well as the related functionality, of the control node are omitted in order not to obscure the concepts presented herein.

Figure 6:
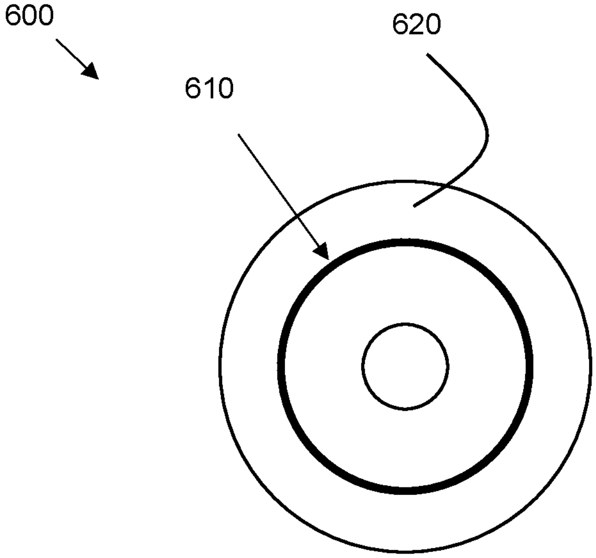
FIG. 6 illustrates a computer program product.

FIG. 6 shows a computer program product 600 comprising a computer program 610 according to the present teaching, and a computer readable storage medium 620 on which the computer program is stored. The computer program 610 comprises a set of operations executable by the control unit 660. The set of operations may be loaded into the storage medium 530 in the control unit 660. The set of operations may correspond to the methods discussed below in connection to FIG. 4.

In the example of FIG. 6, the computer program product 600 is illustrated as an optical disc, such as a CD (compact disc) or a DVD (digital versatile disc) or a Blu-Ray disc. The computer program product could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program is here schematically shown as a track on the depicted optical disk, the computer program can be stored in any way which is suitable for the computer program product.

What is claimed is:

1. An antenna arrangement for an array antenna, the antenna arrangement having a stacked layered structure, the antenna arrangement comprising:

a radiation layer comprising a first slot and a second slot extending along a first slot axis and second slot axis, respectively, where the first and the second slots are arranged in a column extending along a column axis, and where the slot axes are arranged at respective non-zero third and fourth angles with respect to the column axis; and a distribution layer facing the radiation layer, comprising a first ridge waveguide comprising a first ridge and a second ridge waveguide comprising a second ridge, wherein the first and second waveguides are arranged to distribute a radio frequency signal to the first and second slots, respectively, from a distribution layer feed arranged between the first and second ridges, wherein respective waveguiding paths of the first and second waveguides are configured to match respective shapes of the first and second ridges, a first section of the first ridge facing the first slot extends along a first ridge axis and a second section of the second ridge facing the second slot extends along a second ridge axis, where the ridge axes are arranged at respective non-zero first and second angles with respect to the column axis, where the first and second angles are configured to match the third and fourth angles, respectively.

2. The antenna arrangement according to claim 1, wherein the third angle differs from the fourth angle by less than 45 degrees.

3. The antenna arrangement according to claim 1, wherein the third angle differs from the fourth angle by less than 5 degrees.

4. The antenna arrangement according to claim 1, wherein the first angle differs from the third angle by less than 20 degrees.

5. The antenna arrangement according to claim 1, wherein the second angle differs from the fourth angle by less than 20 degrees.

6. The antenna arrangement according to claim 1, wherein a first center of the first slot is arranged offset from the first ridge axis, and a center of the second slot is arranged offset from the second ridge axis.

7. The antenna arrangement according to claim 1, wherein a first center of the first slot is arranged offset from the column axis, and a center of the second slot is arranged offset from the column axis.

8. The antenna arrangement according to claim 1, wherein a first ridge connection point of the first ridge is arranged offset from the column axis, and a second ridge connection point of the second ridge is arranged offset from the column axis, wherein the first and second ridge connection points are arranged in connection with to the distribution layer feed.

9. The antenna arrangement according to claim 1, wherein a distance from a side wall to the ridge in one of the ridge waveguides, measured in a cross section of the waveguide, varies less than 30 percent along the ridge waveguide.

10. The antenna arrangement according to claim 1, wherein the distance between the geometrical centers of the first and the second slots is within 30 percent of half a guide wavelength of a center frequency in a band of operation.

11. The antenna arrangement according to claim 1, comprising a printed circuit board, PCB, layer and a shield layer, wherein the PCB layer comprises at least one PCB layer feed and faces the distribution layer and the shield layer faces the PCB layer.

12. The antenna arrangement according to claim 1, wherein the distribution layer comprises a metamaterial structure, wherein the first and second ridges and the metamaterial structure are arranged to form respective ridge gap waveguides intermediate the distribution layer and the radiation layer.

13. The antenna arrangement according to claim 12, wherein the metamaterial structure comprises a repetitive structure of protruding elements.

14. An array antenna arrangement comprising a plurality of the antenna arrangement according to claim 1.

15. An array antenna arrangement comprising a first and a second antenna arrangement according to claim 1, wherein the first ridge axis of the first antenna arrangement is parallel to and adjacent to the second ridge axis of the second antenna arrangement, wherein a protruding pin is arranged between the first ridge of the first antenna arrangement and the second ridge of the second antenna arrangement, and where that protruding pin is arranged equidistant between the first ridge axis of the first antenna arrangement and the second ridge axis of the second antenna arrangement.

16. A telecommunication or radar transceiver comprising the antenna arrangement according to claim 1.

17. A vehicle comprising the antenna arrangement according to claim 1.

18. The antenna arrangement according to claim 1, wherein the third and fourth angles are within respective ranges of about 20 to 70 degrees.

19. The antenna arrangement according to claim 1, wherein the third and fourth angles are within respective ranges of 40 to 50 degrees.

20. A method for designing an antenna arrangement for an array antenna, the antenna arrangement having a stacked layered structure, the antenna arrangement comprising a radiation layer and a distribution layer facing the radiation layer, the method comprising:

arranging a first and a second slot to extend along a first slot axis and second slot axis, respectively, and to be in a column extending along a column axis, and where the slot axes are arranged at respective non-zero third and fourth angles with respect to the column axis;

arranging a first ridge waveguide comprising a first ridge and a second ridge waveguide comprising a second ridge on the distribution layer to distribute a radio frequency signal to the first and second slots, respectively, from a distribution layer feed arranged between the first and second ridges, wherein waveguiding paths of the first and second waveguides are configured to match respective shapes of the first and second ridges; and arranging a section of the first ridge to face the first slot and to extend along a first ridge axis and a section of the second ridge to face the second slot and to extend along a second ridge axis, where the ridge axes are arranged at respective non-zero first and second angles with respect to the column axis, where the first and second angles are configured to match the third and fourth angles, respectively.

* * * * *